United States Patent [19]
Fee

[11] Patent Number: 5,777,761
[45] Date of Patent: Jul. 7, 1998

[54] SYSTEM AND METHOD FOR PHOTONIC FACILITY AND LINE PROTECTION SWITCHING USING WAVELENGTH TRANSLATION

[75] Inventor: John A. Fee, Plano, Tex.

[73] Assignee: MCI Communications Corporation

[21] Appl. No.: 672,808

[22] Filed: Jun. 28, 1996

Related U.S. Application Data

[63] Continuation-in-part of Ser. No. 577,663, Dec. 22, 1995.
[51] Int. Cl.$^6$ ............................................. H04B 10/08
[52] U.S. Cl. ...................... 359/110; 359/117; 370/225; 370/360
[58] Field of Search ....................... 359/110, 117, 359/128, 139, 173, 179; 370/225, 217, 228, 360, 380; 371/10-2

[56] References Cited

U.S. PATENT DOCUMENTS

| | | | |
|---|---|---|---|
| 4,451,916 | 5/1984 | Casper et al. | 370/16 |
| 4,527,270 | 7/1985 | Sweeton | 371/11 |
| 4,542,502 | 9/1985 | Levinson et al. | 370/88 |
| 4,560,246 | 12/1985 | Cotter | 350/96.16 |
| 4,561,119 | 12/1985 | Epworth | 455/609 |
| 4,596,982 | 6/1986 | Bahr et al. | 340/825.05 |
| 4,704,714 | 11/1987 | Tomizawa et al. | 370/15 |
| 4,745,597 | 5/1988 | Morgan et al. | 370/87 |
| 4,763,315 | 8/1988 | Nakayashiki et al. | 370/16 |

(List continued on next page.)

FOREIGN PATENT DOCUMENTS

| | | |
|---|---|---|
| 0359352 A3 | 3/1990 | European Pat. Off. . |
| 0449475 A2 | 10/1991 | European Pat. Off. . |
| 0 507 379 A | 10/1992 | European Pat. Off. . |
| 0 620 694 A2 | 10/1994 | European Pat. Off. . |
| 0 721 275 A2 | 7/1996 | European Pat. Off. . |
| 2 233 851 | 1/1991 | United Kingdom . |

OTHER PUBLICATIONS

Rabou et al., "Optical Fiber Two-Way FM Video Signal Transmission for Video Conferencing Application," *IEEE Transactions on Consumer Electronics*, vol. 40, No. 3, Aug. 1994, pp. 492–496.

(List continued on next page.)

*Primary Examiner*—Kinfe-Michael Negash

[57] ABSTRACT

A system and method for photonic facility and line protection switching in an optical network to permit fault tolerant operation. The optical network comprises components whose operation is monitored by a controller. If the controller determines an optical transmission line in a signal path has failed, the controller will re-route the signal path through a spare, or protect component. Alternatively, the controller can re-route the signal path through a frequency translator and another optical transmission line.

15 Claims, 6 Drawing Sheets

U.S. PATENT DOCUMENTS

| | | | |
|---|---|---|---|
| 4,768,190 | 8/1988 | Giancarlo | 370/86 |
| 4,797,589 | 1/1989 | Collins | 370/63 |
| 4,821,255 | 4/1989 | Kobrinski | 370/3 |
| 4,831,662 | 5/1989 | Kuhn | 455/608 |
| 4,845,736 | 7/1989 | Posner et al. | 379/27 |
| 4,866,699 | 9/1989 | Brackett et al. | 370/3 |
| 4,887,256 | 12/1989 | Nakayashiki et al. | 370/16 |
| 4,956,835 | 9/1990 | Grover | 370/16 |
| 4,964,095 | 10/1990 | Tyrrell et al. | 370/55 |
| 5,058,105 | 10/1991 | Mansour et al | 370/16 |
| 5,069,521 | 12/1991 | Hardwick | 359/110 |
| 5,081,452 | 1/1992 | Cozic | 340/825.5 |
| 5,091,902 | 2/1992 | Chopping et al. | 370/16.1 |
| 5,166,821 | 11/1992 | Huber | 359/238 |
| 5,179,548 | 1/1993 | Sandesara | 370/16.1 |
| 5,182,744 | 1/1993 | Askew et al. | 370/15 |
| 5,200,964 | 4/1993 | Huber | 372/26 |
| 5,218,465 | 6/1993 | Lebby et al. | 359/110 |
| 5,271,075 | 12/1993 | Gfeller et al. | 385/20 |
| 5,299,293 | 3/1994 | Mestdagh et al. | 359/110 |
| 5,327,427 | 7/1994 | Sandesara | 370/85.14 |
| 5,329,392 | 7/1994 | Cohen | 359/124 |
| 5,329,396 | 7/1994 | Fishman et al. | 359/173 |
| 5,329,520 | 7/1994 | Richardson | 370/16 |
| 5,333,130 | 7/1994 | Weissmann et al. | 370/16 |
| 5,341,364 | 8/1994 | Marra et al. | 370/16.1 |
| 5,343,464 | 8/1994 | Iino et al. | 370/16 |
| 5,359,450 | 10/1994 | Ramachandran et al. | 359/188 |
| 5,365,510 | 11/1994 | Nicholson et al. | 370/16 |
| 5,373,383 | 12/1994 | LaGasse | 359/161 |
| 5,373,385 | 12/1994 | Darcie et al. | 359/162 |
| 5,396,357 | 3/1995 | Goossen et al. | 359/119 |
| 5,420,868 | 5/1995 | Chraplyvy et al. | 370/122 |
| 5,434,691 | 7/1995 | Yamane | 359/117 |
| 5,442,472 | 8/1995 | Skrobko | 359/110 |
| 5,442,623 | 8/1995 | Wu | 370/16.1 |
| 5,446,725 | 8/1995 | Ishiwatari | 370/16.1 |
| 5,452,115 | 9/1995 | Tomioka | 359/123 |
| 5,457,555 | 10/1995 | Moriyama | 359/110 |
| 5,457,556 | 10/1995 | Shiragaki | 359/117 |
| 5,459,715 | 10/1995 | Furuta et al. | 370/16 |
| 5,479,608 | 12/1995 | Richardson | 395/182.02 |
| 5,495,471 | 2/1996 | Chow et al. | 370/16 |
| 5,517,489 | 5/1996 | Ogura | 370/16.1 |
| 5,602,828 | 2/1997 | Engdahl et al. | 370/228 |
| 5,625,478 | 4/1997 | Doerr et al. | 359/125 |
| 5,647,035 | 7/1997 | Cadeddu et al. | 385/24 |
| 5,680,235 | 10/1997 | Johansson | 359/110 |

OTHER PUBLICATIONS

Patent Abstracts of Japan, vol. 095, No. 001, Feb. 28, 1995, JP 06 291739 A, Oct. 18, 1994.

Patent Abstracts of Japan, vol. 12, No. 423, JP 63 160436 A, Jul. 4, 1988.

Hill et al., "A Transport Network Layer Based on Optical Network Elements," *Journal of Lightwave Technology*, vol. 11, No. 5/6, May/Jun. 1993, pp. 667–676.

Aida et al., "Optical Protection Switches for Trunk Transmission Systems," *IEEE International Conference on Communications '88*, vol. 1, Jun., 1988, pp. 1–5.

Brooks et al., "An optical fibre supervisory sub-system employing an entirely optical telemetry path," *European Conference on Optical Communication*, Sep., 1982, pp. 400–405.

Chao et al., "FASTAR —A Robust System for Fast DS3 Restoration," *Globecom '91*, 1991, pp. 1396–1400.

Elrefaie, "Multiwavelength Survivable Ring Network Architectures," *IEEE International Conference on Communications '93*, vol. 2, May, 1993, pp. 1245–1251.

Jensen et al., "Novel technique for monitoring long–haul undersea optical–amplifier systems," *Optical Fiber Communication*, vol. 4, Feb., 1994, pp. 256–257.

Matsuoka et al., "Supervisory Signal Transmission Methods for Optical Amplifier Repeater Systems," *IEEE*, 1990, pp. 1846–1850.

Hadjifotiou et al., "Supervisory Options for Fibre Optical Amplifier Systems," *Fourth I.E.E. Conference on Telecommunication*, Conference Publication No. 371, Apr. 18, 1993, pp. 53–56.

Wagner et al., "Multiwavelength Ring Networks for Switch Consolidation and Interconnection," *Supercomm/International Conference on Communications*, vol. 3, pp. 1173–1179 (Jun. 1992).

Wehr, M. "Wavelength division multiplexing in transmission networks," *Commutation & Transmission*, vol. 17, No. 2, pp. 29–34 (1995).

Murakami et al., "A Remote Supervisory System Based on Subcarrier Overmodulation for Submarine Optical Amplifier Systems," *IEEE: Journal of Lightwave Technology*, vol. 14, No. 5, May, 1996, pp. 671–677.

Yamabayashi et al., "Supervisory Signal Transmission by Modulating the mB1C Code Complementary Bit," *IEEE: Journal of Hightwave Technology*, vol. 9, No. 3, Mar., 1991, pp. 381–385.

Zhou, Jianhui et al., "Four–Wave Mixing Wavelength Conversion Efficiency in Semiconductor Traveling–Wave Amplifiers Measured to 65 nm of Wavelength Shift," *IEEE Photonics Technology Letters*, vol. 6, No. 8, Aug. 1994, pp. 984–987.

Riaziat, M. L. et al., "Optical Wavelength Shifting by Traveling–Wave Electrooptic Modulation," *IEEE Photonics Technology Letters*, vol. 5, No. 9, Sep. 1993, pp. 1002–1005.

Park, E. et al., "Simultaneous All–Optical Packet–Header Replacement and Wavelength Shifting for a Dynamically–Reconfigurable WDM Network," *IEEE Photonics Technology Letters*, vol. 7, No. 7, Jul. 1995, pp. 810–812.

Bhagavath, Vijay K. and Harold Sobol, "Reliability Evaluation and Protection Schemes for Dense WDM Network Architectures," *SUPERCOMM / ICC '92: Discovering a New World of Communication*, 1992, pp. 307.2.1–307.2.5.

Brackett, Charles, "Dense Wavelength Division Multiplexing Networks: Principles and Applications" *IEEE Journal of Selected Areas in Communications*, vol. 8, No. 6, Aug. 1990, pp. 948–964.

Grover, W.D., "Distributed Restoration of the Transport Network," Chapter 11, *Telecommunications Network management into the 21st Century, Techniques, Standards, Technologies and Applications*, Salah Aidarous and Thomas Plevyak editors, IEEE Press, ISBN 0-7803-1013-6, 1994, pp. 337–417.

Wu, Tsong–Ho, "Emerging Technologies for Fiber Network Survivability," *IEEE Communications Magazine*, Feb. 1995, pp. 58–74.

Wu, Tsong–Ho and Sarry Habiby, "Strategies for Planning a Cost–Effective Survivable Fiber Network Architecture Using Optical Switches," *IEEE International Conference on Communications*, 1989, pp. 23.6.1–23.6.7.

DeMeis, R., "Selecte the Right Test Equipment for Your Fiber Optic Needs," *Laser Focus World*, pp. 161–173 (Oct. 1995).

Green, P., *Fiber Optic Networks*, Prentice Hall, pp. 7–10 (1993).

Hecht, Jeff, "Push Is On for Multiwave Optical Networks", *Laser Focus World*, pp. 59–61 (Oct. 1995).

Minoli, D., "Telecommunications Technology Handbook", Artech House: Norwood, MA, Chapters 3 & 7 (1995).

Spirit, D. M. et al., eds., *High Capacity Optical Transmission Explained*, John Wiley & Sons, West Sussex, England, Chapters 1, 6 & 7 (1995).

Waynant et al., "Optical Integrated Circuits", *Electro–Optics Handbook*, McGraw–Hill, Inc.: U.S.A., Chapter 26, pp. 26.1–26.39 (1994).

SYSTEM AND METHOD FOR PHOTONIC FACILITY AND LINE PROTECTION SWITCHING USING WAVELENGTH TRANSLATION

RELATED APPLICATION

This is a continuation-in-part application of the application entitled "System and Method for Photonic Facility and Line Protection Switching", U.S. application Ser. No. 08/577.663, with attorney docket number RIC-95-018 (1575.0440000), filed Dec. 22, 1995.

BACKGROUND OF THE INVENTION

1. Field of the Invention

The present invention relates generally to the reliability and restoration of optical transmission systems, and more specifically to a system and method permitting the optimization of a number of spare components in an optical transmission system using wavelength division multiplexing (WDM).

2. Related Art

Optical networks that include a plurality of optical transmission lines or links permit high bandwidth data communications, and may be used in telephone and other data network systems. High speed data can be modulated on light waves which are transmitted through the optical network. Further bandwidth improvement can be achieved by modulating different electrical data signals on distinct light wave carriers having different frequencies. This technique is known as wavelength division multiplexing (WDM). Optical systems using WDM require optical transmitters and receivers that operate at different light wave frequencies. The optical transmission line, connecting an optical transmitter and receiver, can propagate many light wave signals of different frequencies simultaneously.

Thus, fiber optic communications links, especially WDM communication links, carry vast amounts of information among distant sites to accomplish data, voice and image connectivity over a large geographical area. Optical transmission lines, transmitters and receivers, however, are prone to failure. The failure of such links can have a substantial economic and practical impact on network users and network service providers. Therefore, in designing communications networks, special measures are practiced to assure utmost reliability of network components and survivability in the event of link failure due to physical fiber damage or optical component failure. A common approach to ensure resiliency to fiber cuts is the use of a spare fiber that normally does not carry traffic but may be used as a back-up should a "working" fiber fail. To minimize the chance that the spare fiber experiences the same fate that disabled the working fiber, the spare fiber is usually routed along a completely different physical path. Creating and maintaining such idle spare capacity is costly. Because of the expense and the non-revenue usage, what is needed is a restorative network design where the deployment of spare facilities and spare fiber links is kept to a minimum.

SUMMARY OF THE INVENTION

In accordance with the present invention, there is provided a system and method of photonic facility and line protection switching using frequency or wavelength translation in facilitating a fault-tolerant optical network. In the present invention, the optical network comprises working and protect facilities, working and protect optical transmission lines, optical space division switches (SDSs), and digital cross-connect switches (DCCSs). A working or protect facility is comprised of one or more optical transmitters and/or receivers. Wavelength or frequency translation capability is provided using tunable protect transmitters, tunable protect receivers, and frequency translators coupled to optical space division switches.

The SDS is an optical cross-connect switch facilitating routing of optical signals. It is desirable to use a minimum number of ports on an SDS to reduce SDS cost and complexity. The present invention uses SDSs with a small number of ports. The DCCS is an electrical cross-connect switch facilitating the routing of electrical signals.

The optical transmitters, receivers, and transmission lines have different expected reliabilities. The use of both SDSs and DCCSs permits an optical network to be optimally configured with an appropriate amount of working and protect facilities and optical transmission lines. Depending upon the expected transmitter and transmission line failure rates, an optical system can be configured in accordance with the present invention to include an appropriate number of protect optical transmitters independent of the number of protect optical transmission lines. It is an advantage of the present invention that the ratio of working facilities to protect facilities is independent of the ratio of working optical transmission lines to protect optical transmission lines.

In the event of a component failure in the optical network, the SDSs and DCCSs can respectively re-route optical and electrical signals to compensate for a failed component such as an optical transmitter, receiver, or transmission line. The present invention comprises a protect, or spare, facility or optical transmission line with which to replace a corresponding failed component. Because the network can replace a failed component with a corresponding protect, or spare, component, the optical network can continue functioning despite the failure.

According to a further aspect of the present invention, wavelength translation is provided to optimize facility and line protection switching. Protect facilities include a tunable optical transmitter and a tunable optical receiver. A frequency translator, also called a wavelength translater, is optically coupled to an SDS for translating the frequency or wavelength of optical signals.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the parent invention and, together with the description, further serve to explain the principles of the invention and to enable a person skilled in the art to make and use the invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is directed towards facilitating a fault tolerant optical network. This goal is achieved with photonic facility and line protection using protect, or spare, optical components, such as facilities and optical transmission lines. The topology of the optical network permits use of space division switches (SDSs) with few ports, reducing SDS cost and complexity. Further advantages are realized by providing frequency or wavelength translation capability through tunable protect transmitters, tunable protect receivers, and/or frequency translators coupled to optical space-division switches.

Tunable Facilities

The present invention takes advantage of wavelength division multiplexing (WDM) to add another dimension to restorative design approaches. Previously, a given fiber was associated with a single optical transmitter and a single optical receiver. When one of these devices failed, the restorative action was the same as with a fiber failure, that is, electronically switching the traffic onto a completely different transmitter/fiber/receiver link. But with wavelength division multiplexing, several transmitters feed a single fiber.

The present invention handles single transmitter or single receiver failures in a WDM configuration by electronically and optically switching a reserve. protect tunable facility to replace a corresponding failed facility. The use of a tunable receiver or transmitter in conjunction with a bridgeable optical switch (SDS) yields the unexpected advantage of allowing facility operation ratios to be designed independent of the line protect ratios. For example, the optical domain switching can allow a single tunable transmitter to serve as a backup facility for nine different transmitters operating along three working fibers. The same configuration can provide a three-to-one line protect ratio. These protect ratios can be set totally independently of one another. This design freedom is an important advantage because transmitter failures occur at different rates than fiber failures.

Figure 1:
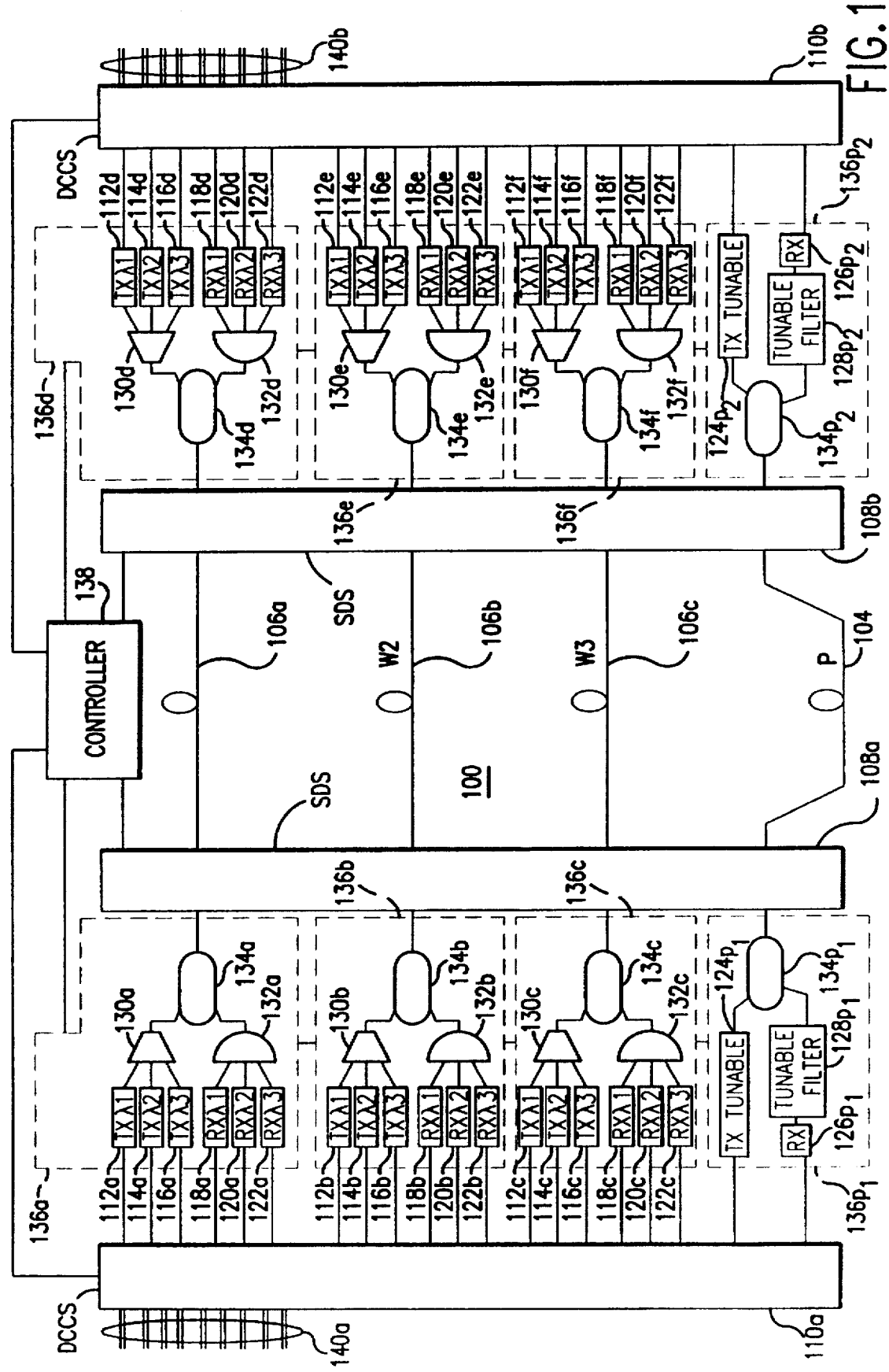
FIG. 1 is a block diagram of a first embodiment of an optical network with photonic facility and line protection according to the present invention.

FIG. 1 illustrates one embodiment of an optical network 100 with a protect optical transmission line 104 and protect tunable facilities $136p_1$ and $136p_2$. The present invention contemplates that the optical network 100 may include more than one protect optical transmission line 104 or two protect facilities $136p_1$ and $136p_2$. In a preferred embodiment, the protect facilities $136p_1$ and $136p_2$ comprise protect optical transmitters $124p_1$ and $124p_2$, protect optical receivers $126p_1$, and $126p_2$, tunable filters $128p_1$ and $128p_2$, and a three-port coupler device $134p_1$ and $134p_2$.

To permit frequency, or wavelength, agility, the carrier frequency of the optical transmitters $112a-f$, $114a-f$, $116a-f$ is made variable by using a tunable source, such as a tunable laser, or a fixed source coupled to a frequency translator. The frequency translator may be an optical mixer. Hence, the optical transmitter may be a tunable optical transmitter. Also, the optical receivers $118a-f$, $120a-f$, $122a-f$, must be tunable so that they can detect the correspondingly broadcast wavelength. The tunable optical receiver may be implemented with a tunable filter $128p_1$ and $128p_2$ as illustrated in FIG. 1 for the protect receivers $126p_1$ and $126p_2$.

The optical network 100 comprises two digital cross-connect switches (DCCSs) $110a,b$ for switching, routing, multiplexing, and demultiplexing electrical signals into higher or lower bit-rates. Electrical signals, which may be in a STS-1 or DS-3 format compliant with SONET standards or any other data format and bit rate, are coupled into and out of ports $140a,b$ of DCCSs $110a,b$. The DCCSs $110a,b$ are coupled to facilities $136a-f$ for converting electrical signals to optical signals and vice-versa. In the preferred embodiment, the facilities $136a-f$ include optical transmitters $112a-f$, $114a-f$, $116a-f$, optical receivers $118a-f$, $120a-f$, $122a-f$, combiners $130a-f$, splitters $132a-f$, and three port coupler devices $134a-f$.

Optical network 100 further includes a pair of space division switches (SDSs) $108a,b$, also called optical cross-connect switches, and working optical transmission lines $106a-c$. SDS $108a$, $108b$ can be any type of multi-port optical cross-connect switch. In principle for a N×N SDS any number of ports, e.g. N=1, 2, 4, 8, 16, 40, 72, 128, or 256, can be switched. Any type of optical switch can be used depending upon the available technology. See, e.g., the integrated lithium niobate directional-coupler type switches discussed by Waynant, R. et al., Eds., *Electro-Optics Handbook*, McGraw-Hill, Inc. U.S.A. (1994), chapter 26, and especially page 26.34 (incorporated herein by reference). Other types of suitable optical switching technology include switches based on a thermo-optic effect in polymer waveguides or silica glass, semiconductor amplification, piezo movement, and integrated indium phosphide.

In addition, while a single SDS $108a$ and SDS $108b$ is shown schematically for clarity, multiple discrete switches and couplers can be used to perform equivalent multiple-port optical switching. For example, a set of discrete 1×2 or 2×2 optical switches can be used to switch individual signals along optical paths between cross-connected ports. Y-couplers and directional couplers can also be used.

The embodiment illustrated in FIG. 1 is specifically implemented in an optical network 100 using wavelength division multiplexing (WDM). Hence, certain components of the optical network 100 are broadband, including the three port devices $134a-f$, $134p_1$ and $134p_2$, combiners $130a-f$, $130p_1$ and $130p_2$, and splitters $132a-f$, $132p_1$ and $132p_2$. The protect transmitter $124p_1$ and $124p_2$ has a tunable carrier frequency and the protect optical receiver $126p_1$ and $126p_2$ can selectively detect light wave signals of varying carrier frequency by changing the passband frequency of a tunable filter $128p_1$ and $128p_2$ coupled to the protect optical receiver $126p_1$ and $126p_2$. In the preferred embodiment, the tunable filters $128p_1$ and $128p_2$ are implemented with Fabry-Perot filters. However, alternative embodiments of the tunable filters $128p_1$ and $128p_2$ can be used.

The electrical signals are routed by the DCCSs $110a,b$ to or from optical transmitters $112a-f$, $114a-f$, $116a-f$ or receivers $118a-f$, $120a-f$, $122a-f$, respectively, as designated by a controller 138. Distinct electrical signals entering optical network 100 are modulated onto light wave carriers having different frequencies (e.g., frequencies corresponding to wavelengths $\lambda_1$, $\lambda_2$, and $\lambda_3$) by the optical transmitters $112a-f$, $114a-f$, $116a-f$. In a preferred embodiment, the optical transmitters 112a–f, 114a–f, 116a–f are modulated lasers, such as, directly modulated semiconductor laser diodes, or externally modulated lasers. Other types of optical transmitters and modulators can be used. For the sake of clarity, only working facilities 136a and 136d are described in detail.

In one working facility 136a, the outputs of the optical transmitters 112a, 114a, 116a having different output carrier frequencies, i.e., wavelengths $\lambda_1$ to $\lambda_3$, are unified in a combiner 130a which is then connected to a three port device 134a. The three port device 134a permits bidirectional light wave signals to be coupled into and out of separate ports. In the preferred embodiment, the three port device 134a may be comprised of a directional coupler, such as those made with fused optical fibers. Other types of three port devices 134a made of known fiber optic components can be used. The three port device 134a is connected to the SDS 108a.

Under normal conditions, SDS 108a routes the combination of modulated light wave signals having different carrier frequencies into the optical transmission line 106a. In the preferred embodiment, the optical transmission line 106a includes bidirectional optical fibers, line repeaters, and/or amplifiers. However, the optical transmission line 106a can comprise only unidirectional optical fibers and amplifiers. Alternatively, the optical transmission line 106a could comprise a long-haul, single-mode optical fiber exclusively. The other end of the optical transmission line 106a is coupled to another SDS 108b which routes the light wave signals to another working facility 136d and its corresponding three port device 134d during normal operation.

The light wave signals then propagate from the three port device 134d to a splitter 132d. In a preferred embodiment, the splitter 132d includes a WDM multiplexer (not shown) which has frequency selective outputs corresponding to the carrier frequencies comprising the light wave signal. The WDM multiplexer is typically formed by an optical grating that spatially separates light of different wavelengths.

Alternatively, the splitter 132d may comprise a n-way power divider. Wavelength selectivity can be attained with the n-way power divider by inserting filters between the n-way power dividers and the optical receivers 118d, 120d, 122d. However, filters are not needed if the optical receivers 118d, 120d, 122d are frequency selective.

Each output of the splitter 132d is coupled to an optical receiver 118d, 120d, 122d. In the preferred embodiment, the optical receivers 118d, 120d, 122d are standard optical detectors. Alternative optical receiver 118d, 120d, 122d embodiments can be used. The optical receiver 118d, 120d, 122d demodulates an electrical signal from the light wave signal of the corresponding carrier frequency. The electrical signal is then coupled through a second DCCS 110b to one of its ports 140b back to the electrical domain.

A controller 138 is connected to components, such as the optical transmitters 112, 114, 116 and receivers 118, 120, 122, in the optical network 100. The controller 138 senses whether the optical network components are functioning properly. In a preferred embodiment, the controller 138 is a processor and detects loss of signal and/or other types of optical faults. Alternatively, the controller 138 can comprise a plurality of distributed processors that are coordinated by a communications link (not shown). If a component fails, the controller 138 re-routes the signals passing through the failed component to a protect, or spare, component, utilizing the switching capabilities of the SDSs 108a,b and DCCSs 110a,b. Spare components include a protect optical transmission line 104, a protect optical receiver 126$p_1$ and 126$p_2$ with a tunable filter 128$p_1$ and 128$p_2$, and/or a protect optical transmitter 124$p_1$ and 124$p_2$.

Figure 2:
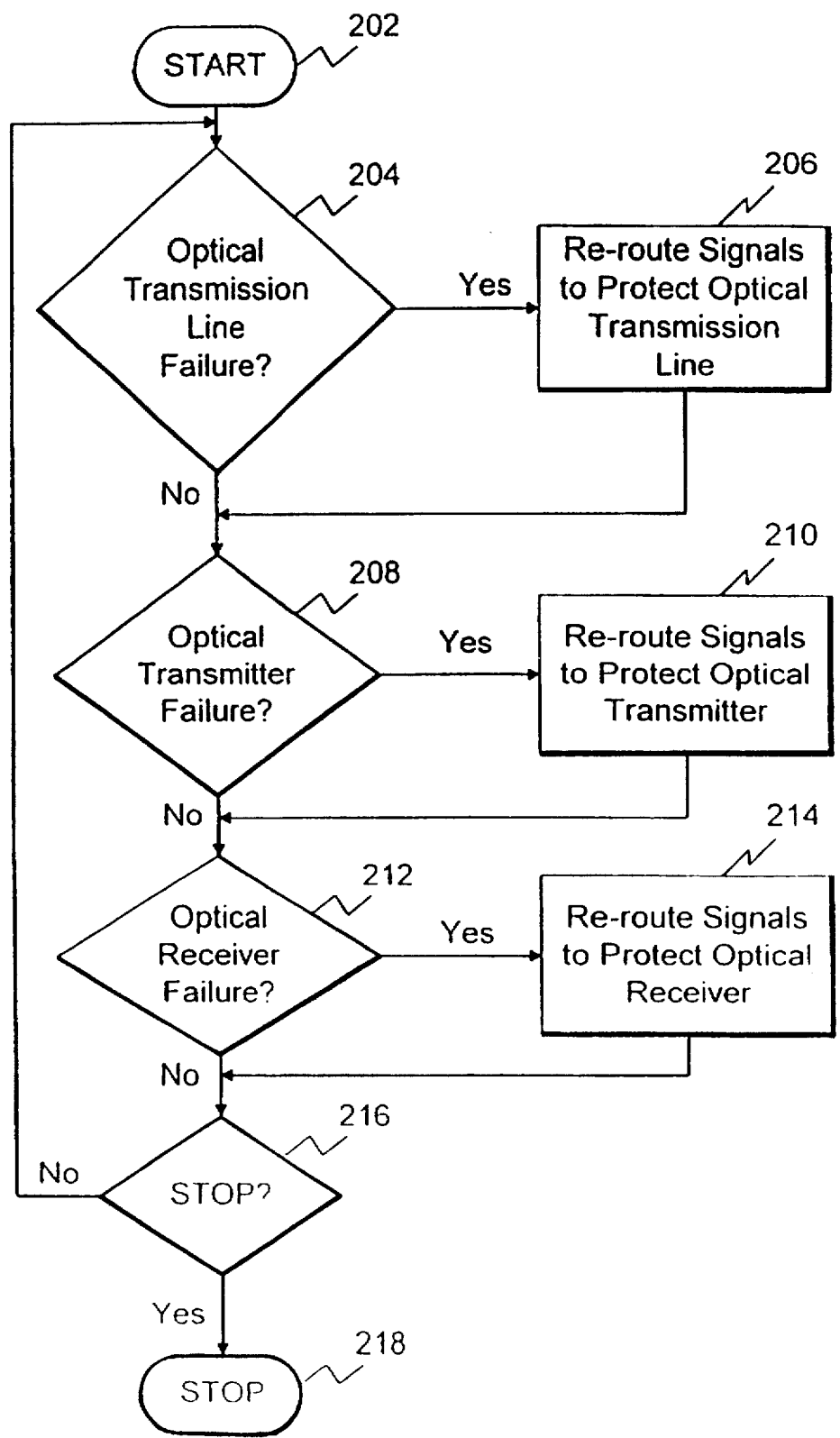
FIG. 2 is a flow chart of the operation of the first embodiment of an optical network with photonic facility and line protection.

FIG. 2 illustrates a flow chart of exemplary operation of the fault tolerant nature of the optical network 100. The functionality described below is implemented by controller 138. When optical network 100 commences operation, or alternatively when the optical network first detects a component fault, (step 202), the controller 138 evaluates whether any of the optical transmission lines 106a–c have failed (step 204). One way for the optical network 100 to determine optical transmission line 106a–c failure is for the controller 138 to monitor the lack of reception of light wave signals by all optical receivers 118a–f, 120a–f, 122a–f connected to a specific optical transmission line 106a–c.

If the controller 138 determines that an optical transmission line 106a–c has failed, the controller 138 commands a corresponding SDS 108a,b to re-route the optical signals to an available protect, or spare, optical transmission line 104 (step 206). While a protect optical transmission line 104 is utilized, it is generally unavailable for further use.

Upon replacing a failed optical transmission line or if none was found, the controller 138 evaluates whether any optical transmitters 112a–f, 114a–f, 116a–f have failed (step 208). If the controller 138 determines an optical transmitter 112a–f, 114a–f, 116a–f has failed, the controller 138 commands the corresponding DCCS 110a,b to re-route the electrical signals from the failed optical transmitter to a protect, or spare, optical transmitter 124$p_1$ and 124$p_2$ (step 210). At about the same time, the protect optical transmitter 124$p_1$ and 124$p_2$ is tuned to the wavelength corresponding to the failed optical transmitter as directed by controller 138. The re-routed electrical signal is modulated on a light wave carrier by the protect optical transmitter 124$p_1$ and 124$p_2$. The resulting modulated light wave signal is then coupled through some of the same components, including the working optical transmission line 106a–c and the optical receiver 118a–f, 120a–f, 122a–f, that the original light wave signal had propagated through before the optical transmitter 112a–f, 114a–f, 116a–f failure.

Finally, upon replacing a failed optical transmitter, or if none was found, the controller 138 will determine if any optical receivers 118a–f, 120a–f, 122a–f have failed (step 212). If the controller 138 determines an optical receiver 118a–f, 120a–f, 122a–f has failed, then the controller 138 commands the corresponding SDS 108a,b to re-route the light wave signal from the failed optical receiver to a protect, or spare, optical receiver 126$p_1$ and 126$p_2$ (step 214).

One example of how the controller 138 may determine that an optical receiver 118a–f, 120a–f, 122a–f has failed is now described. The optical receiver 118a–f, 120a–f, 122a–f presents to controller 138 a signal indicating that optical receiver 118a–f, 120a–f, 122a–f has detected a light wave signal. If the optical receiver 118a–f, 120a–f, 122a–f does not present such a signal, and the controller 138 determines that there is no corresponding optical transmission line 106a–c failure, then the controller 138 will conclude that the optical receiver 118a–f, 120a–f, 122a–f has failed.

At about the same time the controller 138 commands the SDS 108a,b to re-route the light wave signal, the controller 138 regulates the protect optical receiver 126$p_1$ and 126$p_2$ operating frequency by setting the passband of the corresponding tunable filter 128$p_1$ and 128$p_2$. The detected electrical signal is re-routed by a DCCS 110a,b to the same port 140a,b that the demodulated electrical signal exited before the optical receiver 118a–f, 120a–f, 122a–f failure.

If operation of the controller 138 is halted, the aforementioned process will be stopped (step 218). Otherwise the process will repeat itself, again analyzing if an optical transmission line 106a–c failure has occurred (step 204).

Note, however, that some of the steps described above could be implemented in another order or in parallel. Such an implementation would be apparent to one skilled in the art.

Frequency Translators

According to a further advantage of the present invention, optical network capacity is maintained in the event that a working optical transmission line fails and no protect optical transmission line is available to replace it. In such an event, the present invention transfers the signals of the failed working optical transmission line to another working optical transmission line. Frequency translators are provided to permit these additional restored carrier signals to co-exist with the normal carrier signals being transmitted on the other working optical transmission line.

Figure 3:
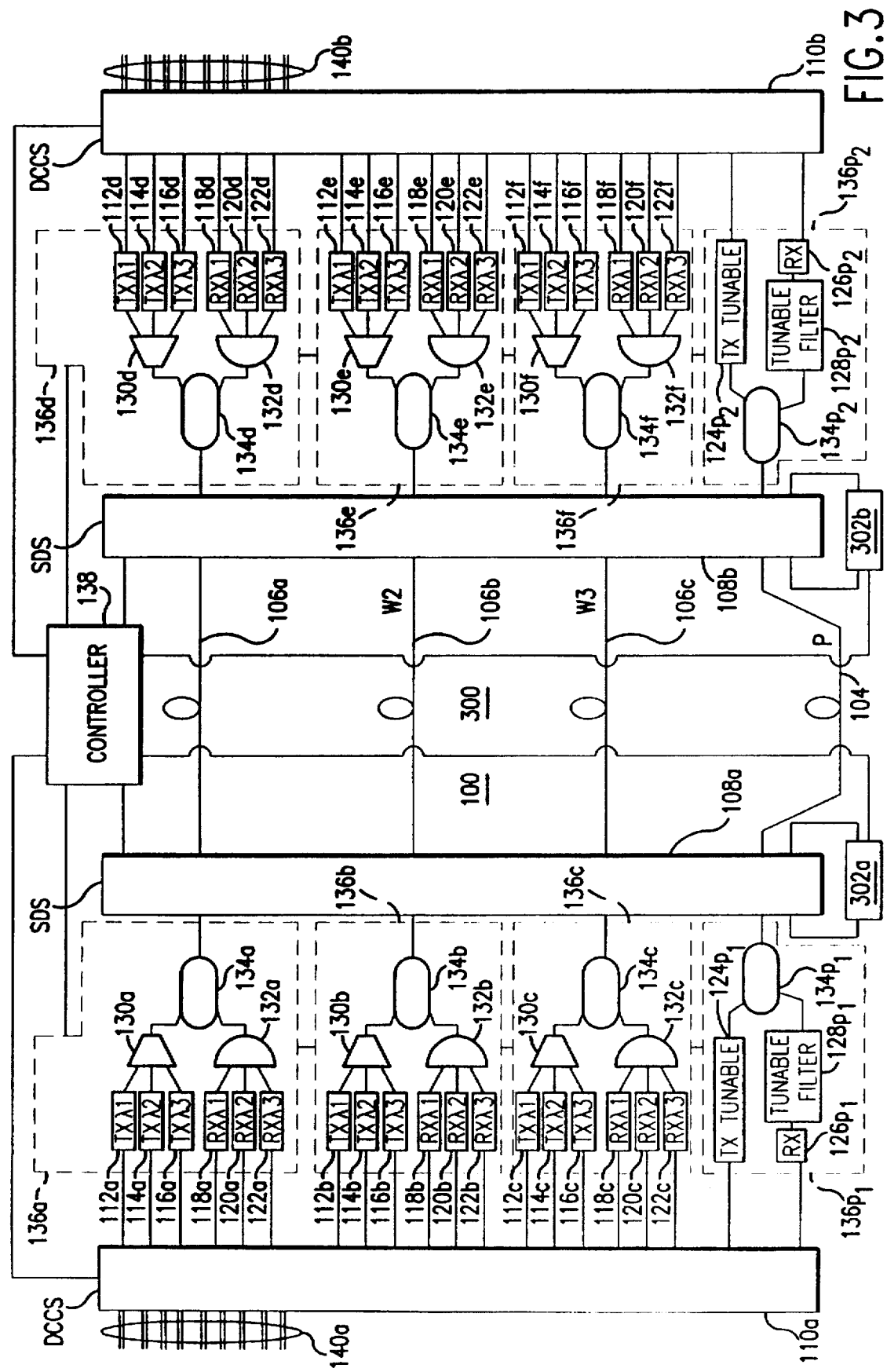
FIG. 3 is a block diagram of a second embodiment of an optical network with frequency or wavelength translators according to the present invention.

A second embodiment of the present invention is illustrated in FIG. 3. The optical network 300 in FIG. 3 has two frequency translators 302a,b optically coupled to ports in the two space division switches 108a,b. The frequency translators 302a,b are coupled to the controller 138. The frequency translators 302a,b permit a composite set of carrier signals ($\lambda_1$ to $\lambda_3$) to be adjusted to another set of wavelengths ($\lambda_4$ to $\lambda_6$). For example, the SDS 108a routes the signals that previously would have traveled on the failed working optical transmission line to frequency translator 302a coupled to the SDS 108a. The carrier frequencies $\lambda_1$ to $\lambda_3$ of the signals are then modified in the frequency translator 302a to $\lambda_4$ to $\lambda_6$. The signals are re-routed by the SDS 108a to another working optical transmission line 106a–c.

At least two frequency translators for accomplishing frequency or wavelength translation are known. See, e.g., the articles by Zhou et al., "Four-Wave Mixing Conversion Efficiency in Semiconductor Traveling-Wave Amplifiers Measured to 65 nm of Wavelength Shift", *IEEE Photonics Technology Letters*, Vol. 6, No. 8 (August 1994); and Riazat et al., "Optical Wavelength Shifting by Traveling-Wave Electrooptic Modulation", *IEEE Photonics Technology Letters*, Vol. 5, No. 9 (September 1993) (each of which is incorporated herein in its entirety by reference). One technique involves four-wave mixing through a non-linear semiconductor optical amplifier as described by Zhou et al. This technique is analogous to the heterodyning (mixing) of high frequency electrical signals commonly done in radio equipment. The second technique uses traveling-wave electrooptic modulation wherein microwaves and optical signals travel through a substrate together. As described by Riazat et al., the microwaves produce a refractive index gradient in the substrate that travels with, and alters the wavelength of, the passing optical signal. One or more frequency translators 302a,b can be coupled to the optical network 100.

Figure 4:
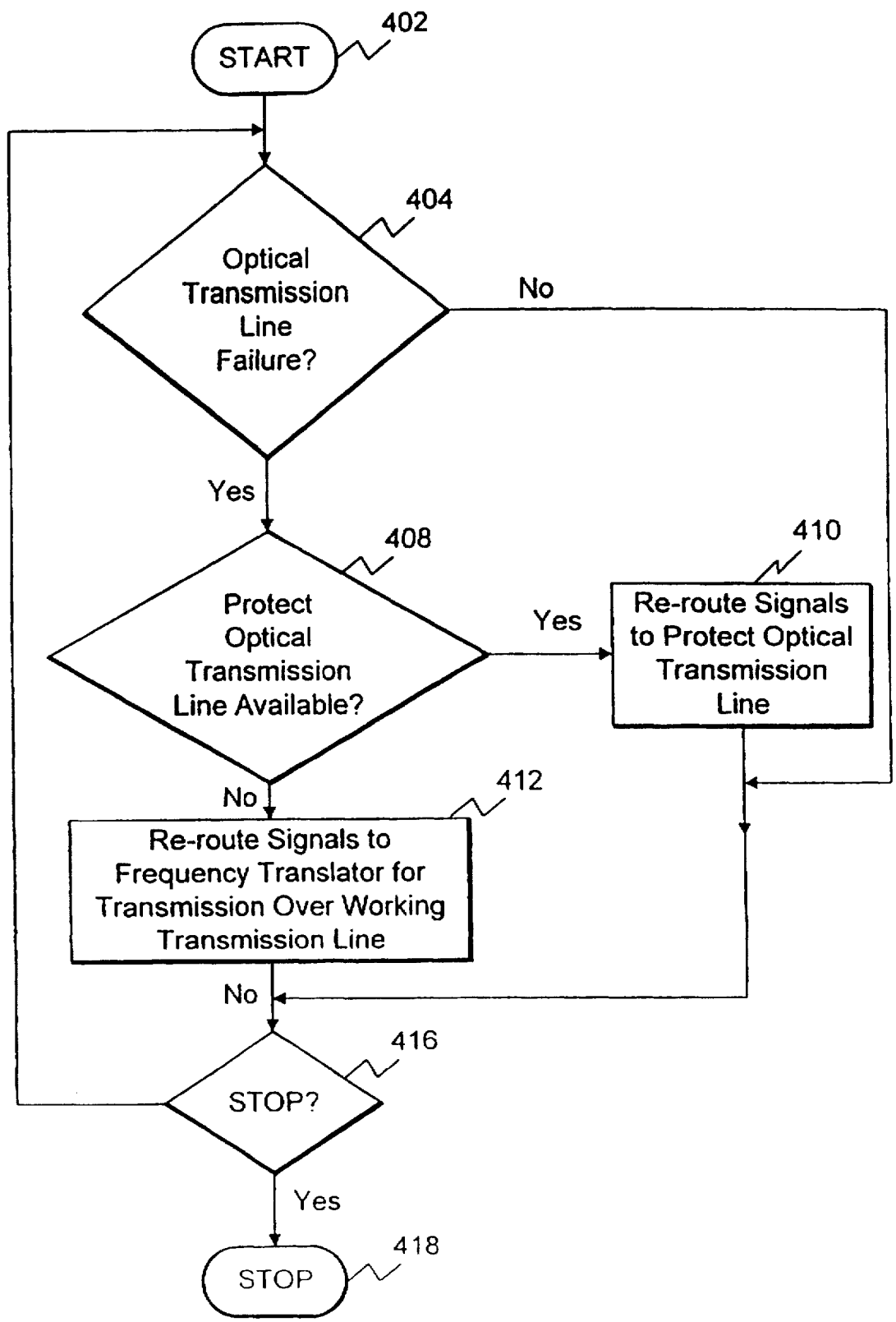
FIG. 4 is a flow chart of the operation of the second embodiment of an optical network with frequency translators.

FIG. 4 illustrates a flow chart of exemplary operation of the optical network 300 using one or more frequency translators 302a,b. The functionality described below is implemented by controller 138 which starts fault detection at step 402 when optical network 300 commences operation.

In step 404, the controller 138 determines whether any optical transmission lines have failed. If the controller 138 determines that no optical transmission lines 106a–c have failed, the controller 138 may continue to search for optical transmission line 106a–c faults (step 416) or cease searching (step 418). However, if the controller 138 determines that an optical transmission line 106a–c has failed, the controller 138 will next determine if a protect optical transmission line 104 is available for use. If a protect optical transmission line 104 is available for use, the controller 138 will re-route the signals from the failed optical transmission line 106a,b through the protect optical transmission line 104.

However, if no protect optical transmission line is available or if none was implemented in the optical network 300, the controller 138 will re-route optical data signals from the failed optical transmission line 106a–c through each SDS 108a,b to one or more frequency translators 302a,b and over an available working transmission line 106a–c (step 412). For example, in the frequency translator 302a, the signals will be shifted from an initial set of carrier frequencies to another set of optical carrier frequencies, allowing the signals from any of the transmitters 112a–c, 114a–c, 116a–c, or $124p_1$ to be transmitted through the SDS 108a over a functioning working or protect optical transmission line 106a–c, 104 with other signals at different carrier frequencies without interference (step 412). These translated optical signals can then be routed through SDS 108b for detection as the translated wavelength or frequency by any appropriately tuned receiver 118d–f, 120d–f, 122d–f, or $126p_2$.

Alternatively, the controller 138 can route the translated signals to the other frequency translator 302b so that the signals are frequency shifted back to their initial frequency (or another frequency) so that the signals can be detected by the optical receivers 118d–f, 120d–f, 122d–f, or $126p_2$.

Alternatively, signals can be routed from the second SDS 108a,b to tunable receivers which are adjusted by the controller 138 to detect the signals having the shifted carrier frequencies. The optical network 100 may then choose to continue searching for failed optical transmission lines (step 416) or stop its analysis (step 418).

Some of the steps described above could be implemented in another order or in parallel. Such an implementation would be apparent to one skilled in the art.

Figure 5:
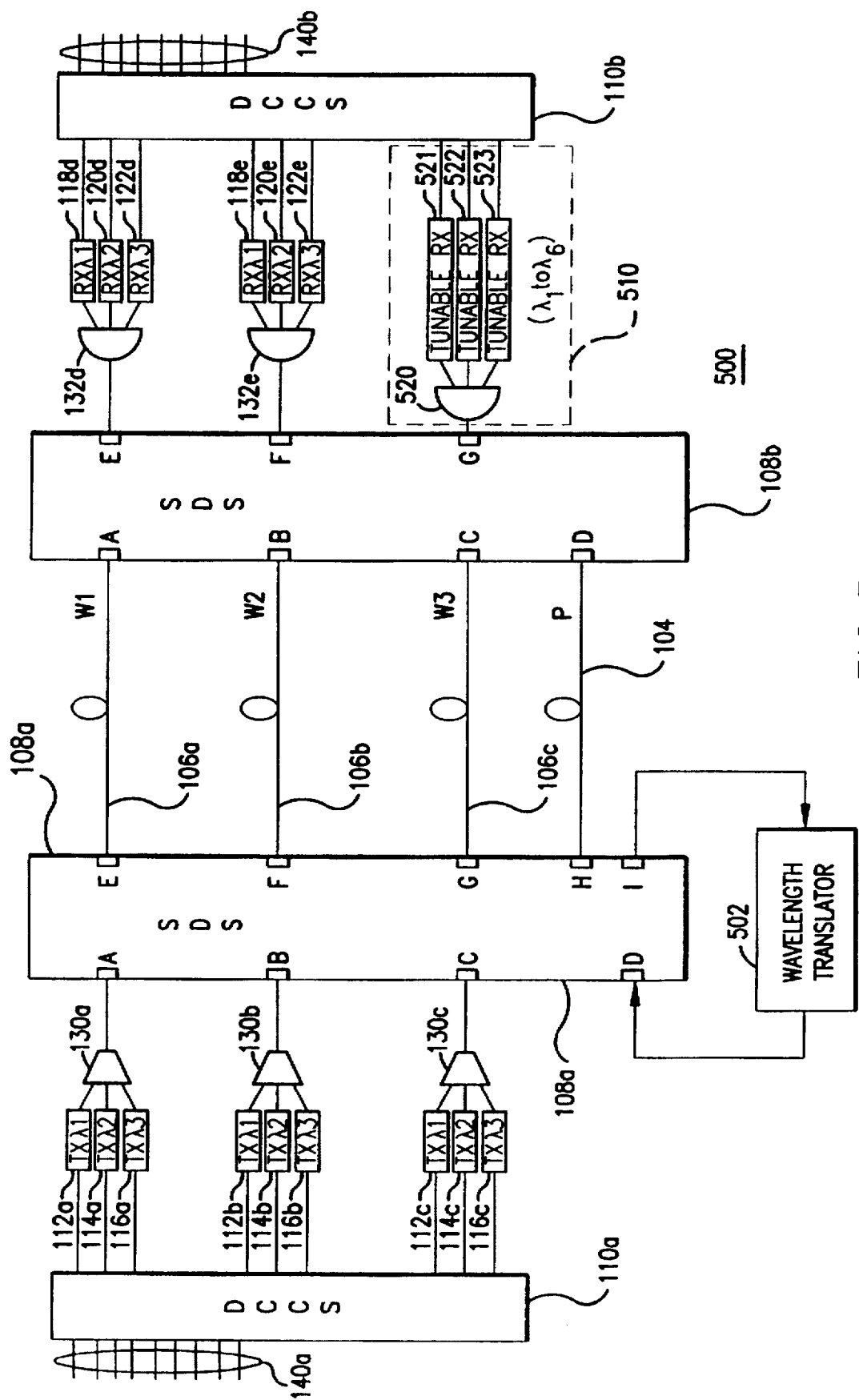
FIG. 5 is a block diagram of a third embodiment of an optical network using frequency or wavelength translators according to the present invention.

A third component of the present invention is illustrated in FIG. 5 in an optical network 500. For clarity, only network elements for communication in one transmission direction from electrical inputs 140a to output electrical outputs 140b are shown. Only active ports A to I in SDS 108a and ports A to G in SDS 108b are shown. Other ports could be provisioned as needed.

One wavelength or frequency translator 502 is optically coupled to the optical space-division switch 108a. The wavelength translator 502 accepts a set of multiplexed optical carrier signals at wavelengths, e.g., $\lambda_1$ to $\lambda_3$, and outputs a wavelength-shifted set of optical carrier signals, e.g., $\lambda_4$ to $\lambda_6$, that exhibit the same relative separation and modulation characteristics. A protect receiver facility 510 is coupled between SDS 108b and DCCS 110b for transducing carrier signals. A splitting element 520 passes carrier signals received from the SDS 108b to three tunable receivers 521–523. For example, splitting element 520 can be one or more optical components, such as, beam splitters, filters, and/or gratings for splitting input carriers into three separate signals. The tunable receivers 521–523 are then tuned to detect a particular wavelength within a respective separated signal. During normal operation, three tunable receivers 521–523 are tuned to detect an initial set of wavelengths $\lambda_1$ to $\lambda_3$. During restoration, the three tunable receivers 521–523 are tuned to detect the shifted-set of wavelengths $\lambda_4$ to $\lambda_6$ generated by the wavelength translator 502.

Figure 6:
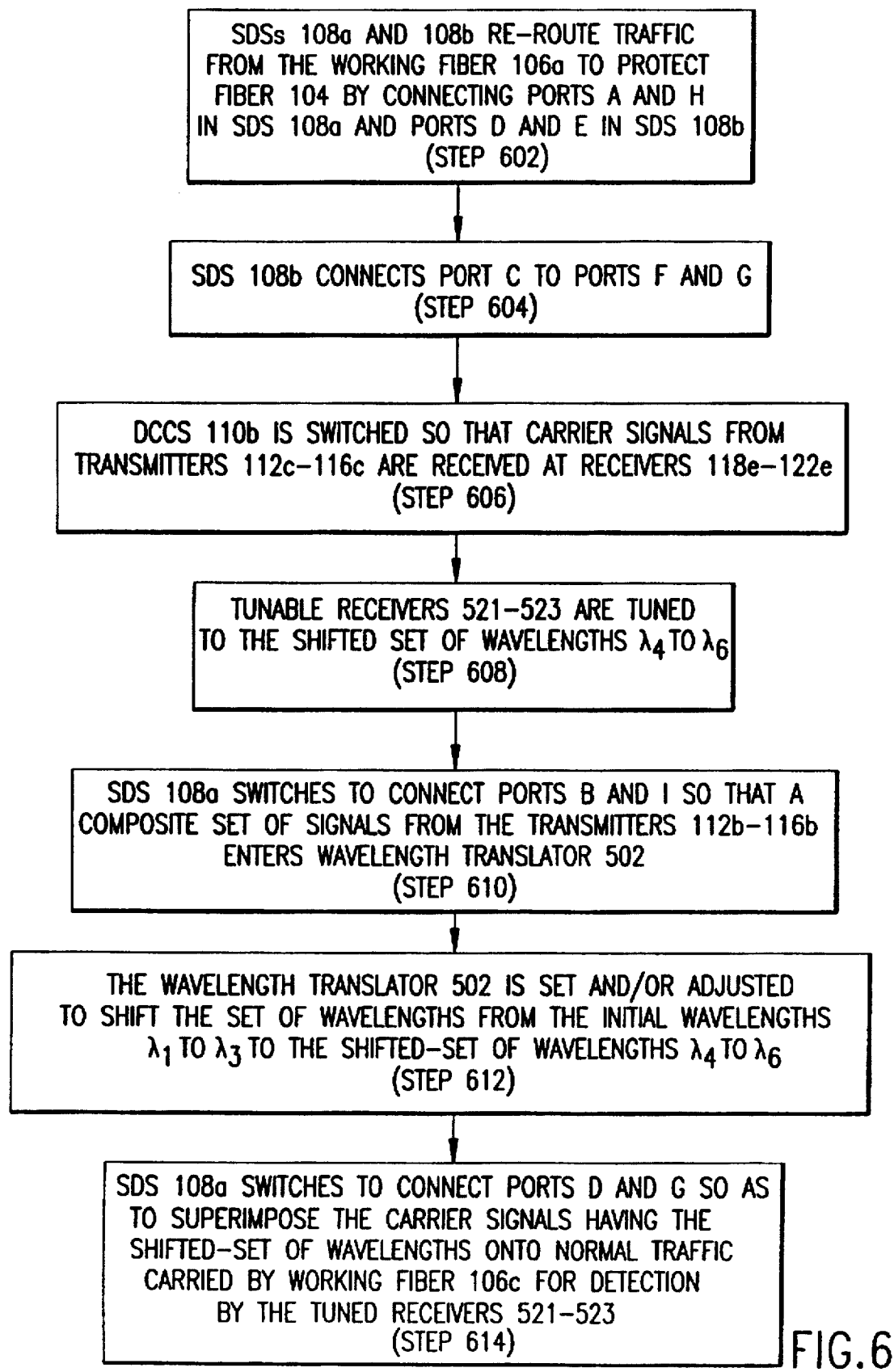
FIG. 6 is a flowchart of the operation of the third embodiment when the number of failed working fibers exceeds the number of protect fibers.

Network 500 provides frequency agility which allows restoration of network capacity even when no protect fiber is available or the number of working fiber failures exceeds the number of protect fiber provided. The restoration operation of network 500 in the event two working fibers 106a and 106b are damaged will be described with respect to FIG. 6. The restoration operation is carried out through controller 138 (not shown) which is connected to SDS 108a, 108b, wavelength translator 502, working and protect facilities (transmitters 112–116a–c and receivers 118–122d–e, 521–523), and DCCS 110a, 110b, as described earlier with respect to FIGS. 1 and 3.

SDSs 108a and 108b are switched to re-route traffic from the working fiber 106a to protect fiber 104 by connecting ports A and H in SDS 108a and ports D and E in SDS 108b (step 602). SDS 108b is switched to connect port C to ports F and G (step 604). DCCS 110b is switched so that carrier signals from transmitters 112c–116c are received at receivers 118e–122e (step 606).

Tunable receivers 521–523 are tuned to the shifted set of wavelengths $\lambda_4$ to $\lambda_6$ (step 608). SDS 108a switches to connect ports B and I so that a composite set of signals from the transmitters 112b–116b enters wavelength translator 502 (step 610). The wavelength translator 502 is set and/or adjusted to shift the set of wavelengths from the initial wavelengths $\lambda_1$ to $\lambda_3$ to the shifted-set of wavelengths $\lambda_4$ to $\lambda_6$ (step 612). Finally, SDS 108a switches to connect ports D and G so as to superimpose the carrier signals having the shifted-set of wavelengths onto normal traffic carried by working fiber 106c for detection by the tuned receivers 521–523 (step 614).

It should be understood that embodiments of the present invention can be implemented in hardware, software or a combination thereof. In such embodiment, the various components and steps would be implemented in hardware and/or software to perform the functions of the present invention. Any presently available or future developed computer software language and/or hardware components can be employed in such embodiments of the present invention. In particular, the flow chart discussed above can be especially useful for creating the software embodiments.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An optical network comprising:

an optical transmission line;

a space division switch coupled to said optical transmission line;

a protect optical transmission line coupled to said space division switch;

an optical transmitter coupled to said space division switch;

an optical receiver coupled to said space division switch;

a controller coupled to said space division switch, said optical transmitter, and said optical receiver, wherein said controller routes optical signals through said space division switch to said protect optical transmission line when said controller determines that said optical transmission line has failed;

a digital cross-connect switch coupled to said optical transmitter and said optical receiver; and a protect tunable optical transmitter coupled between said space division switch and said digital cross-connect switch, wherein, when said controller determines that said optical transmitter has failed, said controller routes an electrical input signal through said digital cross-connect switch to said protect tunable optical transmitter such that electrical input signals originally destined for said optical transmitter are sent to said protect tunable transmitter and routes a corresponding optical signal output from said protect optical transmitter through said space division switch to said optical transmission line; whereby, a facility protect ratio can be set independent of a line protect ratio.

2. The optical network of claim 1, comprising:

a protect tunable optical receiver coupled to said space division switch and said digital cross-connect switch, wherein said controller routes electrical output signals from said protect tunable optical receiver through said digital cross-connect switch when said controller determines that said optical receiver has failed.

3. An optical network comprising:

an optical transmission line;

a space division switch coupled to said optical transmission line;

a protect optical transmission line coupled to said space division switch;

an optical transmitter coupled to said space division switch;

an optical receiver coupled to said space division switch;

a controller coupled to said space division switch, said optical transmitter, and said optical receiver, wherein said controller routes optical signals through said space division switch to said protect optical transmission line when said controller determines that said optical transmission line has failed;

a digital cross-connect switch coupled to said optical transmitter and said optical receiver; and a protect tunable optical receiver coupled to said space division switch and said digital cross-connect switch, wherein, when said controller determines that said optical receiver has failed, said controller routes electrical output signals from said protect tunable optical receiver through said digital cross-connect switch such that said electrical output signals from said protect optical receiver replaces electrical output signals output from said optical receiver; whereby, a facility protect ratio can be set independent of a line protect ratio.

4. The optical network of claim 2, wherein said controller adjusts a carrier frequency of signals broadcast from said protect tunable optical transmitter and adjusts a filter frequency of said tunable optical receiver.

5. An optical network comprising:

an optical transmission line;

a space division switch coupled to said optical transmission line;

an optical transmitter coupled to said space division switch;

an optical receiver coupled to said space division switch;

a frequency translator coupled to said space division switch; and a controller coupled to said space division switch, said frequency translator, said optical transmitter, and said optical receiver, wherein said controller routes optical signals through said space division switch to said frequency translator when said controller determines that said optical transmission line has failed.

6. The optical network of claim 5, wherein said controller adjusts the carrier frequency of signals broadcast from said frequency translator to said optical receiver.

7. The optical network of claim 5, comprising:

a digital cross-connect switch coupled to said optical transmitter and said optical receiver; and a protect optical transmitter coupled to said space division switch and said digital cross-connect switch, wherein said controller routes electrical input signals through said digital cross-connect switch to said protect optical transmitter when said controller determines that said optical transmitter has failed.

8. The optical network of claim 7, comprising:

a protect optical receiver coupled to said space division switch and said digital cross-connect switch, wherein said controller routes electrical output signals to said digital cross-connect switch from said protect optical receiver when said controller determines that said optical receiver has failed.

9. An optical network of claim 5, comprising:

a digital cross-connect switch coupled to said optical transmitter and said optical receiver; and a protect optical receiver coupled to said space division switch and said digital cross-connect switch, wherein said controller routes electrical output signals to said digital cross-connect switch from said protect optical receiver when said controller determines that said optical receiver has failed.

10. A method of operating a fault tolerant optical network comprising the steps of:

(1) determining if an optical transmission line has failed;

(2) re-routing signals bound for said optical transmission line through a space division switch to a frequency translator if said optical transmission line has failed;

(3) modifying a carrier frequency of said signals in said frequency translator; and (4) routing said signals from said frequency translator through said space division switch to a working optical transmission line.

11. The method of operating a fault tolerant optical network of claim 10, further comprising the steps of:

(5) adjusting a tunable optical receiver to a wavelength corresponding to said carrier frequency of said signals generated by said frequency translator; and (6) routing said signals through a second space division switch to said tunable optical receiver.

12. The method of operating a fault tolerant optical network of claim 10, further comprising the steps of:

(5) adjusting a second frequency translator to a wavelength corresponding to said carrier frequency of said signal generated by frequency translator; and (6) routing said signals through a second space division switch to said second frequency translator.

13. An optical network comprising:

a digital cross-connect switch;

a facility coupled to said digital cross-connect switch;

a protect facility coupled to said digital cross-connect switch;

a space division switch coupled to said facility and said protect facility;

an optical transmission line coupled to said space division switch;

a protect optical transmission line coupled to said space division switch;

a frequency translator coupled to said space division switch; and a controller coupled to said frequency translator, said digital cross-connect switch, said facility, said protect facility, and said space division switch.

14. The optical network of claim 13, wherein said facility comprises:

an optical transmitter;

a combiner coupled to said optical transmitter;

an optical receiver;

a splitter coupled to said optical receiver; and a three port device coupled to said combiner and said splitter.

15. The optical network of claim 13, wherein said protect facility comprises:

a protect optical transmitter;

a protect optical receiver;

a tunable filter coupled to said protect optical receiver; and a three port device coupled to said protect optical transmitter and said tunable filter.

* * * * *